United States Patent [19]

Kandakov et al.

[11] 4,045,056
[45] Aug. 30, 1977

[54] EXPANSION COMPENSATOR FOR PIPELINES

[76] Inventors: Gennady Petrovich Kandakov, Sevastopolsky prospekt 51, kv. 163; Georgy Vasilievich Matveev, Novokhoroshovskoe shosse 25, kv. 58; Viktor Yakovlevich Miller, Perekopskaya ulitsa 11, kor. 4, kv. 41, all of Moscow, U.S.S.R.

[21] Appl. No.: 622,393

[22] Filed: Oct. 14, 1975

[51] Int. Cl.² .................... F16L 51/02; F16L 53/00
[52] U.S. Cl. .................................... 285/41; 285/53; 285/226
[58] Field of Search ............. 285/41, 47, 187, 226, 285/299, 53

[56] References Cited

U.S. PATENT DOCUMENTS

| 2,470,989 | 5/1949 | Keller et al. | 285/226 X |
| 2,520,751 | 8/1950 | Zucrow | 285/226 X |
| 2,799,522 | 7/1957 | King et al. | 285/41 X |
| 3,105,708 | 10/1963 | Esty | 285/41 |
| 3,214,197 | 10/1965 | Gruber | 285/41 |
| 3,574,357 | 4/1971 | Alexandru | 285/47 |
| 3,901,539 | 8/1975 | Ijzerman | 285/41 |
| 3,901,646 | 8/1975 | Coenders et al. | 285/226 X |
| 3,922,008 | 11/1975 | Stiner et al. | 285/41 |

FOREIGN PATENT DOCUMENTS 1,332,322 6/1963 France .......................... 285/299

Primary Examiner—Thomas F. Callaghan

[57] ABSTRACT

An expansion compensator for pipelines of the type including a metal casing lined with refractory materials comprising a corrugated sheath and annular distributing members for a coolant supply beneath the corrugated sheath, the distributing members being located at the inner side of the metal casing of the pipeline.

7 Claims, 3 Drawing Figures

EXPANSION COMPENSATOR FOR PIPELINES

The present invention relates to expansion compensators for pipelines of the type including a metal casing lined with refractory materials.

The invention may be used in lined pipelines which are employed for conveyance of hot gases under pressure and which have a large extension and intricate configuration; such as pipelines used in the chemical and metallurgical industries.

The invention may also be used in air heaters with separate combustion chambers which are used in the blast furnace technology and in other industries, where a large volume of air is to be heated, e.g. in special plants employed in physical research conducted at high-energy levels.

The present invention may be most efficiency used for lined hot blasting pipelines pipelines employed in the construction of blast furnace plants.

Hot blasting pipelines are used for supplying to a blast furnace air heated in air heaters at about 1400° C under a pressure of 3-5 atm. These pipelines have a length of about 15-150 m, an intricate configuration and a large diameter of about 2-4 m.

A lined hot blasting pipeline comprises an annular portion connected to a blast furnace by means of a blast inlet equipment and a mainline portion which is rigidly and sealingly connected to the air heaters.

Normally, air heated at 1000° C is supplied under 3 atm. pressure to a blast furnace via hot blasting pipelines.

At present, an average hot blasting temperature in modern blast furnace plants is up to 1200° C with the prospect of an increase up to 1400° C with the blasting pressure of up to 5 atm. This will enable savings of coke, and therefore, the cost reduction of cast iron produced.

Air supplied to a blast furnace heats the pipeline at a high temperature. The inner surface of the lining is heated at the temperature of the air being supplied, and the outer surface of the metal casing of the pipeline is heated at 80°-180° C.

A considerable load (thrust) is transmitted to the metal casing of the pipeline from the heated lining, together with the load from the hot blasting air pressure.

The thrust induces high circumferential and axial stresses in the metal casing of the pipeline which are 4-6 times higher than the stresses appearing in the casing of the pipeline from the internal hot blasting air pressure.

For that reason, in operation, a considerable amount of defects (overheats, deformations, cracks) appear at the joints between portions of lined pipelines and at the joints with the air heaters.

In order to eliminate these disadvantages, expansion compensators are used in modern hot blasting pipelines to compensate for displacements of portions of the pipeline which are due to the heating thereof and other loads mentioned above.

Constructions of expansion compensators for lined pipelines are rather diverse, but normally they comprise corrugates metal sheaths and expansion joints in the lining.

Compensator constructions are different in methods of fastening corrugated sheaths to metal casings of lined pipelines, number of corrugations, thickness of corrugations and design of expansion joints of the lining:

The experience of operation shows, however, that expansion compensators represent a weak point in the hot blasting pipeline systems, because cracks and overheats appear also at the points of their installation. Sealed joints between the corrugated sheaths and pipeline casings fail, and the integrity of lining is frequently lost in the zone of expansion compensators.

Known in the art is an expansion compensator for pipelines which are made in the form of a metal casing lined with refractory materials, comprising a corrugated sheath which sealingly interconnects adjacent portions of the pipeline mounted in a spaced relation to one another, and annular distributing members for a coolant supply beneath the corrugated sheath disposed at either side of the space between the portions of the pipeline. The annular distributing members are provided with pipes for supplying the coolant so as to protect the expansion compensator against overheating.

The annular distributing members are sealingly welded with corner welds to the outer surface of the casing of the adjacent portions of the pipeline and, at the same time, they serve as support members for edges of the corrugated sheath of the expansion compensator, the edges being, in turn, sealingly welded with corner welds to said distributing members.

This expansion compensator provides unobstructed displacements of the lined pipelines and may take-up not only axial displacements, but also angular rotations and lateral motions of the end faces of the adjacent pipeline portions. Thus, the integrity of the lining is not lost due to the fact that there is provided a space between the adjacent portions of the pipeline.

It should be noted, however, that combining the functions of support and working members in the annular distributing members under the action of expansion thrust of the lining and high hot blasting air pressure in such an expansion compensator results in difficulties in the manufacture and operation of the expansion compensator.

The corner welds interconnecting the ends of the corrugated sheath and the annular distributing members and the latter and the casing of the lined pipeline are very difficult to execute, especially taking into account the quality requirements. Furthermore, it is very difficult to perform flaw detection of the corner welds which is very important since radial deformations of the pipeline casing resulting from the expansion thrust of the lining are transmitted to the corner welds, and, as noted above, these deformations are 5-6 times higher than the hot blasting air pressure.

It should be also noted that an expansion compensator operates under alternating cyclic load conditions which are due to fluctuations of ambient temperature, pressure and temperature of the blasting air.

In addition, the overall diameter of the expansion compensator includes the diameter of annular distributing members which, as noted above, serve as support members for the corrugated sheath which is very important for large-diameter pipelines. Difficulties are encountered in transporting expansion compensators to the assembly site, horizontal thrust loads from the internal blasting air pressure in operation are materially increased resulting in a respective weight increase of fixed supports or anchoring devices taking-up these loads. With pipeline diameters more than three meters and hot blasting air pressure 4-5 atm, a reduction of the overall diameter of an expansion compensator by 100-200 mm results in the lowering of the horizontal thrust force from blasting air pressure by 50-100 tons.

In the above-described construction of the expansion compensator, the corrugated sheath, which is generally made of a thin metal sheet, is subjected to overheating by heat radiation from red-hot inner surface of the lining which is especially dangerous during short-term suspensions of coolant supply. Dangerous situations also exist at the moments of interruption of blasting, when the coolant is not fed to under the corrugated sheath. In these situations, an expansion compensator may completely fail under the action of thermal radiation.

The main object of the invention is to provide an expansion compensator having the smallest possible overall diameter so as to reduce horizontal thrust loads from the internal blasting air pressure as compared to known expansion compensators.

Another, important object of the invention is to provide an expansion compensator for pipelines which has a simple construction and is easy in the manufacture.

Still another object of the invention is to provide an expansion compensator reliably operating in lined large-diameter pipelines.

These and other objects are accomplished by the provision of an expansion compensator for pipelines of the type including a metal casing lined with refractory materials comprising a corrugated sheath which sealingly interconnects adjacent portions of the pipeline mounted in a spaced relation to one another, and annular distributing members for a coolant supply beneath the corrugated sheath disposed at either side of the space between the portions of the pipeline, the distributing members having pipes for supplying the coolant, wherein, according to the invention, the annular distributing members are arranged at the inner side of the casing and each distributing member is formed by the inner surface of the casing, a shell of a diameter which is substantially smaller than the diameter of the casing and a pair of rings mounted between the casing and the shell of which one ring is sealingly connected to the casing and shell and the other ring, which is the nearest one to the space between the adjacent portions, is connected to the casing with the provision for the coolant supply beneath the corrugated sheath which is sealingly connected, with the ends thereof, directly to the casing.

The arrangement of the annular distributing members at the inner side of the casing allows for making the expansion compensator the maximum compact possible, the outside diameter depends only on the diameter of the pipeline which is selected from the production requirements, and on the height of corrugations of the sheath. This is very important for the construction of fixed supports or anchoring devices taking-up horizontal loads from the hot blasting air pressure. As it was noted above, the reduction of the overall diameter of the expansion compensator by 100-200 mm for pipelines of a diameter of about 3000 mm by arranging the annular distributing members within the casing reduces the load by 50-100 tons with a blasting air pressure of 4-5 atm so that important savings of metal for the construction of supports or anchoring devices are achieved.

The shells forming the inner annular distributing members are concurrently used for absorbing the main radial forces from the expansion thrust in the lining at the portion of installation of the corrugated sheath. They are made in such a manner as to substantially completely eliminate the application of these forces to the joint welds between the pipeline casing and corrugated sheath. Therefore, only the loads from the internal blasting air pressure are applied to these welds, and as noted above, these forces are 5-6 times lower than the thrust forces from lining. This provides for an improved reliability of the expansion compensator as compared to known expansion compensators of similar types.

The possibility of excessive overheating of the shells and rings is eliminated because a permanent supply of a coolant is effected via the supply pipes into the annular distributing members formed by these elements of the construction.

The supply pipes for admitting the coolant to the annular distributing members are preferably sealingly connected to the casing of the lined pipeline which is provided with holes for that purpose arranged between the two rings forming the annular distributing members, the other ends of the pipes being connected to a cold blasting pipeline inserted between an air blower and air heaters of a blast furnace. In this case, there is no need in the use of any control equipment for matching the pressure of a coolant (air in this specific case) in the annular distributing members with the hot blasting air pressure in the lined pipeline, because with the existing technique of blasting and heating of blast furnaces, the values of air pressure in the cold and hot blasting pipelines are interdependent from one another and differ only in the value of hydraulic losses due to the flow of air through an air heater. This difference normally would not exceed 0.1-0.2 atm. Taking into account certain losses of pressure of cold blasting air in the supply pipes, the pressure of the coolant (air) in the annular distributing members of this construction will always be by 0.05-0.1 atm higher than the hot blasting air pressure in the lined pipeline. Therefore, there will be no convective flows of hot blasting air towards the corrugated sheath and shells.

Cold blasting is effected at a stable temperature which is favourable for durability of all metal elements of the expansion compensator and service life of the lining in the zone of the space between the adjacent portions of the pipeline.

The ring, which is the nearest one to the space between the adjacent portions of the pipeline, is preferably provided with passages for feeding the coolant to and under the corrugated sheath.

This enables uniform distribution of the coolant along the perimeter of the corrugated sheath.

Each shell is preferably provided with ridges extending along the internal perimeter of the end facing the space between the adjacent portions of the pipeline.

This is necessary to reinforce these ends since the shells take-up the entire load from the radial thrust force from the heated lining in the zone of the expansion compensator.

The ends of the corrugated sheath are preferably sealingly connected to the casing by means of butt welds.

This type of weld is the most reliable in operation under alternating cyclic loads and is the most convenient for a flaw detection (using ultrasonic methods or X-rays) during the assembly.

The space between the adjacent portions of the pipeline, as well as the annular space between the shells and the corrugated sheath are preferably filled with a soft, gas-permeable heat insulating and refractory material.

Due to its gas permeability, this material will not hamper the passage of the coolant, while reliably protecting the corrugated sheath against abrupt overheating as a result of heat emission from the inner red-hot lining surface, especially with a rather large space between the end faces of the lining (up to 80-100 mm), as well as at the moments of temporary suspension of hot blasting with respective suspension of the coolant supply to the annular distributing members. Due to its softness, this material does not hamper the expansion displacements of the elements of the compensator and adjacent portions of the pipeline.

Kaolin wool is preferably used as the filling material.

Kaolin wool exhibits all the above-mentioned properties and is refractory at up to 1700° C.

Filling the space between the shells and the inner surface of the corrugated sheath with kaolin wool results, as show the investigations, in a certain difference in heating of the sheath and the adjacent portions of the casing (up to 20°-30° C). This phenomenon is, however, stable, and does not affect strength and durability of the joints.

Due to the above-described construction of component parts of the expansion compensator, it is now possible to reduce the overall diameter of the expansion compensator, simplify its manufacture and enable a more reliable operation thereof in lined large-diameter pipelines as compared to known expansion compensators of similar types.

The invention will now be described in details with reference to specific embodiments thereof illustrated in the accompanying drawings, in which.

Figure 1:
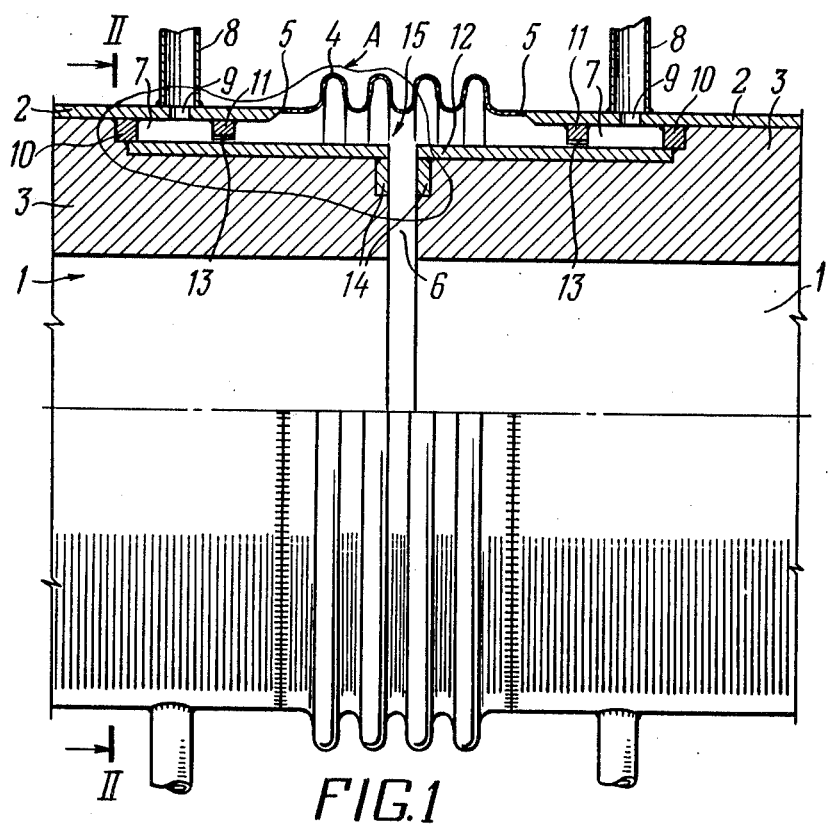
FIG. 1 is a part sectional view of an expansion compensator according to the invention.
Figure 2:
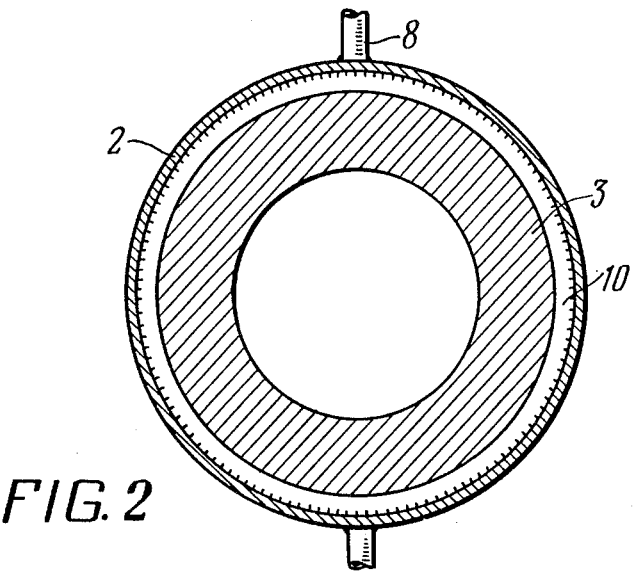
FIG. 2 is a sectional view taken along line II—II in FIG. 1.

Adjacent portions 1 of a pipeline (only the ends thereof are shown in FIG. 1) comprise a casing 2 lined with refractory materials 3. The casing 2 is normally made of a constructional steel (low-carbon or low-alloy steel grades) and is welded of single sheets of a thickness of the order from 10 to 30 mm. The refractory materials 3 of a thickness of about 200-300 mm normally consist of several different layers (not shown in the drawings). The inner layers are generally made of dense refractory materials, and the layers which are the nearest to the casing 2 consist of light-weight refractory materials.

The expansion compensator comprises a corrugated sheath 4 which is sealingly connected with the edges thereof, by means of a butt weld 5, directly to the casing 2 of the adjacent portions 1 of the pipeline which are mounted with a space 6 therebetween.

The corrugated sheath 4 is made of a thin steel sheet.

Annular distributing chambers 7 for a coolant supply beneath the corrugated sheath 4 are arranged at either side of the space 6 at the inner side of the casing 2 and have pipes 8 for supplying the coolant.

The pipes 8 are sealingly welded to the casing 2 which has holes 9 for that purpose. The holes 9 are made between rings 10, 11 which, together with shells 12, form said annular distributing chambers 7.

Figure 3:
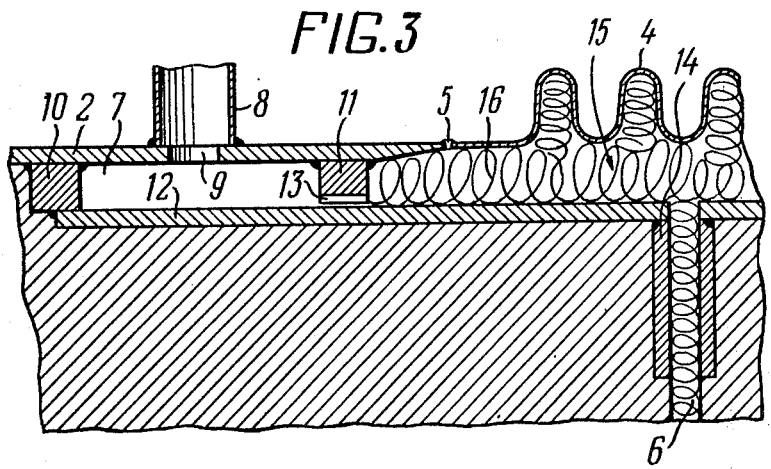
FIG. 3 is an enlarged detail A in FIG. 1.

The rings 10 are sealingly connected, by means of corner welds, to the inner surface 3 of the casing 2 and to the ends of the shells 12 (FIG. 3). The rings 11 (FIG. 1) are welded only to the inner surface of the casing 2 and are provided with passages 13 (FIG. 3) for the coolant supply beneath the corrugated sheath 4.

The shells 12 (FIG. 1) are provided with ridges 14 along the inner perimeter of the end facing the space 6, the ridges being received in the end faces of the refractory materials 3. The ridges 14 have shaped chamfered edges for welding to the shells 12 (FIG. 3).

In this specific example, the space 6 between the adjacent portions 1 of the pipeline, as well as the annular space 15 between the shells 12 and the corrugated sheath 4 are filled with kaolin wool 16.

It should be noted that the space 6 and the annular space 15 may also be filled with any other appropriate soft, gas-permeable, heat insulating and refractory material, such as high-alumina wool.

During the construction, the expansion compensator is assembled in the following order.

First, the casings 2 of the adjacent portions 1 of the pipeline are mounted in the design position. It should be noted that the rings 10, 11 are welded to the ends of the casings 2 beforehands, and the shells 12 are inside the casings 2 outside the zone of installation of the expansion compensator. The diameter of the shells 12 is such that they should pass between the rings 10 and 11. Then the corrugated sheath 4 is mounted in the design position, and the ends thereof are welded by butt welds 5 to the casing 2.

The quality of the butt welds 5 is checked, all eventual defects are remedied, and only after that are the shells 12 mounted in the design position.

The annular space 15 between the shells 12 and the corrugated sheath 4 is filled with kaolin wool through the space 6. Then the ridges 14 are welded to the ends of the shells 12.

Finally, the operations of lining the expansion compensator and pipeline with refractory materials 3 are performed.

The dimensions of structural members of the expansion compensator, the number and height of corrugations of the corrugated sheath 4, the amount of space between the adjacent portions 1 of the pipeline depend on the length and configuration of the adjacent portions 1 of the pipeline, materials used and construction of the lining, temperature and pressure of the blasting air flowing in the pipeline, construction of the pipeline supports, and, in each specific case, these parameters are determined by calculations.

The inner surface of the refractory materials 3 in the lined pipelines is heated at 1100°-1400° C, and the temperature of the outer surface of the casing 2 generally does not exceed 80°-180° C and depends on fluctuations of the ambient temperature. The hot blasting air pressure in the pipeline is about 3-5 atm.

The expansion compensator enables unobstructed displacements of the adjacent portions 1 of the pipeline and can absorb not only axial displacements, but also angular rotations and lateral motions of the ends of the adjacent portions 1 of the pipeline. The integrity of the lining of the refractory materials 3 is not lost because there is provided the space 6 between the adjacent portions 1 of the pipeline.

The shells 12 completely absorb the radial loads from the expansion thrust of the refractory materials 3 in the zone of the corrugated sheath 4, whereby these forces are not applied to the butt welds 5. In the case, only the loads from the internal blasting air pressure and those due to the rigidity of the corrugated sheath 4 during the relative displacements of the adjacent portion 1 of the pipeline are applied to the butt welds 5, but these loads are several times lower than the thrust load.

This improves the reliability of the expansion compensator according to the invention as compared to known expansion compensators of similar types.

The arrangement of the annular distributing members 7 at the inner side of the casing 2 makes it possible to have more compact expansion compensator. This permits a reduction of horizontal loads from the internal blasting pressure, hence savings of metal for the construction of supports (not shown) taking-up this load are achieved.

The arrangement of the annular distributing members 7 at the inner side of the casing 2 requires, however, a certain reduction of thickness of the refractory materials 3 in the zone of installation of the shells 12. It should be, however, noted that there is no possibility of overheating of the shells 12 and rings 10, 11 due to this thickness reduction, because the coolant is permanently supplied via the pipes 8 to the annular distributing members formed by these components.

The pipes 8 are connected to a cold blasting pipeline which connects an air blower to air heaters of a blast furnace (not shown).

In this case, there is no need in any control equipment for matching the value of pressure of the coolant (air in this specific example) in the annular distributing chambers 7 with the hot blasting air pressure, because with the existing methods of supplying and heating blasting air for blast furnaces, the air pressure in the cold and hot blasting pipelines are interdependent and differ from one another only in the value of hydraulic losses due to the air flow through the air heaters. This difference does not exceed 0.1–0.2 atm.

Taking into account some head losses of cold blusting air in the supply pipes 8 with this specific construction of the expansion compensator, the pressure of the coolant in the annular distributing chambers 7 will always be by 0.05–0.1 atm. higher than the hot blasting air pressure in the lined pipeline, and cold air will be fed through the passages 13 in the ring 11 to under the corrugated sheath 4 and father into the space 6 and pipeline.

An admixture of a minor amount of coolant to a large mass of hot air is not critical since it cannot have any effect on the temperature of hot blasting air, whereas the convective hot air flows towards the corrugated sheath 4, shells 12 and ridges 14 are completely eliminated.

Cold blasting air has a stable temperature which is favourable for durability of all metal elements of the expansion compensator and service life of the refractory materials 3 in the zone of the space 6 between the adjacent portions 1 of the pipeline.

Filling the space 6 between the adjacent portions 1 of the pipeline and the annular space 15 between the shells 12 and the corrugated sheath 4 with kaolin wool 16 provides for reliable protection of the corrugated sheath 4 and the ridges 14 against overheating by thermal radiation from the inner red-hot surface of the refractory materials 3 and at the moments of suspension of the coolant supply to the annular distributing chambers 7.

Due to its gas permeability, kaolin wool 16 does not hamper an unobstructed flow of the coolant in the annular space 15 and the space 6. At the same time, the kaolin wool 16 is a soft material so that it does not interfere with displacements of the elements of the expansion compensator and adjacent portions 1 of the pipeline.

The refractoriness of the kaolin wool 16 provides for durability of the elements of the expansion compensator which are protected therewith in operation at high blusting air temperatures. Kaolin wool 16 may be replaced by high-alumina wool which has the properties similar to those of kaolin wool and may withstand still higher temperatures.

Filling the annular space 15 between the shells 12 and the corrugated sheath 4 with the kaolin wool 16 results in a certain difference in heating of the sheath and the adjacent portions of casings 2 of about 20°–30° C since the wool is a good heat insulating material which is required for reliable protection of the corrugated sheath 4 in operation during temporary suspension of hot air and coolant supply.

This phenomenon is, however, stable, and the investigations show that it cannot affect strength and service life of the butt welds 5.

Thus, with the construction according to the invention, the outside diameter of the expansion compensator depends only on the diameter of the adjacent portions 1 of the pipeline and height of corrugations of the corrugated sheath 4.

The butt welds interconnecting the corrugated sheath 4 and the casing 2 are simple and enable flaw detection using ultrasonic methods or X-rays, and the thrust action of the refractory materials 3 is substantially not transmitted thereto since this thrust is absorbed by the shells 12 in this zone.

Therefore, the expansion compensator according to the invention the lined pipelined is compact and simple in the manufacture. Partially unloaded, controllable butt weld behave under severe operational conditions more reliably than any other type of joint. The expansion compensator according to the invention is advantageous over known compensators.

What is claimed is:

1. An expansion compensator for pipelines of the type including a metal casing lined with refractory materials, said compensator comprising: a corrugated sheath having its ends sealingly connected to said casing of adjacent portions of the pipeline mounted in a spaced relation to one another; shells having a diameter which is substantially smaller than the diameter of said casing, said shells being arranged within said casing; rings disposed between said casing and said shells and sealingly connected thereto; further rings, which are nearest to the space between the adjacent portions of the pipeline, said further rings being disposed between said casing and said shells and connected to one thereof and extending towards the other to define passages for a coolant supply beneath said corrugated sheath; annular distributing chambers for said coolant supply beneath said corrugated sheath arranged at either side of said space and at the inner side of said casing, each of the distributing chambers being formed by the inner surface of said casing, said shell, one of said first-mentioned rings sealingly connected to said casing and said shell and one of said further rings which is the nearest one to said space; and pipes for said coolant supply connected to said annular distributing chambers.

2. The expansion compensator according to claim 1, wherein the ring, which is nearest to said space between the adjacent portions of the pipeline, is provided with passages for said coolant supply beneath said corrugated sheath.

3. The expansion compensator according to claim 1, wherein each said shell is provided with ridges extending along the inner perimeter of the end thereof facing the space between the adjacent portions of the pipeline.

4. The expansion compensator according to claim 1, wherein said corrugated sheath is sealingly connected, with the ends thereof to said casing by means of butt welds.

5. The expansion compensator according to claim 1, wherein the space between said adjacent portions of the pipeline, as well as an annular space between said shells and said corrugated sheath is filled with a soft, gas-permeable, heat insulating and refractory filling material.

6. The expansion compensator according to claim 5, wherein said filling material comprises kaolin wool.

7. The expansion compensator according to claim 1 wherein said further rings are secured to said casing and project towards said shells into spaced relation therewith for defining said passages.

* * * * *